(12) United States Patent
Qin et al.

(10) Patent No.: US 11,099,445 B2
(45) Date of Patent: Aug. 24, 2021

(54) DISPLAY PANEL AND DISPLAY APPARATUS

(71) Applicants: BOE TECHNOLOGY GROUP CO., LTD., Beijing (CN); KENT STATE UNIVERSITY, Kent, OH (US)

(72) Inventors: Guangkui Qin, Beijing (CN); Dengke Yang, Beijing (CN); Xiaochen Zhou, Beijing (CN)

(73) Assignees: BOE TECHNOLOGY GROUP CO., LTD., Beijing (CN); KENT STATE UNIVERSITY, Kent, OH (US)

( * ) Notice: Subject to any disclaimer, the term of this patent is extended or adjusted under 35 U.S.C. 154(b) by 666 days.

(21) Appl. No.: 15/327,823

(22) PCT Filed: May 5, 2016

(86) PCT No.: PCT/CN2016/081110
§ 371 (c)(1),
(2) Date: Jan. 20, 2017

(87) PCT Pub. No.: WO2017/133096
PCT Pub. Date: Aug. 10, 2017

(65) Prior Publication Data
US 2018/0052341 A1     Feb. 22, 2018

(30) Foreign Application Priority Data

Feb. 1, 2016   (CN) .......................... 2016 1 0070365

(51) Int. Cl.
*G02F 1/137*     (2006.01)
*G02F 1/1337*    (2006.01)
(Continued)

(52) U.S. Cl.
CPC ............ *G02F 1/137* (2013.01); *G02F 1/1337* (2013.01); *G02F 1/134363* (2013.01);
(Continued)

(58) Field of Classification Search
CPC ....... G02F 1/137; G02F 1/0045; G02F 1/1337
(Continued)

(56) References Cited

U.S. PATENT DOCUMENTS 4,997,591 A * 3/1991 Heppke ................ C07D 239/26
                                                   252/299.61
6,271,905 B1 * 8/2001 Sekime ............. G02F 1/133632
                                                       349/117
(Continued)

FOREIGN PATENT DOCUMENTS

CN         101097366 A      1/2008
CN         101555406 A     10/2009
(Continued)

OTHER PUBLICATIONS

Machine translation of CN203178578U (Year: 2013).*
(Continued)

*Primary Examiner* — Lucy P Chien

(57) ABSTRACT

A display panel and a display apparatus are provided. The display panel includes a first substrate and a second substrate which are arranged oppositely. A liquid crystal layer is filled between the first substrate and the second substrate, the liquid crystal layer has dielectric anisotropy of parameter in a range from −1 F/m to 1 F/m, a sum of a bending flexural coefficient and a splaying flexoelectric coefficient of the liquid crystal layer is greater than 1 pc/m, and liquid crystal molecules in the liquid crystal layer are deflected by a flexoelectric effect, so that deflecting speed of the liquid crystal molecules in the liquid crystal layer is improved and the response time of the liquid crystal layer is shortened.

18 Claims, 3 Drawing Sheets

(51) Int. Cl.
*G02F 1/1343* (2006.01)
*G02F 1/139* (2006.01)
*G02F 1/00* (2006.01)

(52) U.S. Cl.
CPC .............. *G02F 2001/13706* (2013.01); *G02F 2001/13712* (2013.01); *G02F 2001/13787* (2013.01); *G02F 2001/133738* (2013.01); *G02F 2001/133742* (2013.01); *G02F 2001/133773* (2013.01)

(58) Field of Classification Search
USPC .......................................................... 349/96
See application file for complete search history.

(56) References Cited

U.S. PATENT DOCUMENTS

| | | | |
|---|---|---|---|
| 2003/0001809 A1* | 1/2003 | Hattori | G02F 1/134336 345/87 |
| 2003/0168633 A1* | 9/2003 | Wellinghoff | C07C 69/90 252/299.01 |
| 2004/0165128 A1* | 8/2004 | Vithana | G02F 1/1393 349/113 |
| 2005/0064154 A1* | 3/2005 | Aylward | B41M 3/006 428/195.1 |
| 2014/0055430 A1* | 2/2014 | Hirosawa | G02F 1/134363 345/204 |

FOREIGN PATENT DOCUMENTS

| | | |
|---|---|---|
| CN | 103619992 A | 3/2014 |
| CN | 104321410 A | 1/2015 |
| CN | 104364347 A | 2/2015 |
| CN | 104487542 A | 4/2015 |
| CN | 105190417 A | 12/2015 |
| CN | 105549290 A | 5/2016 |
| WO | 2006/066688 A1 | 6/2006 |
| WO | 2009/052632 A1 | 4/2009 |

OTHER PUBLICATIONS

International Search Report and Written Opinion dated Sep. 23, 2016; PCT/CN2016/081110.
The First Chinese Office Action dated Mar. 30, 2018; Appln. No. 201610070365.0.

* cited by examiner

DISPLAY PANEL AND DISPLAY APPARATUS

TECHNICAL FIELD

Embodiments of the present disclosure relate to a display panel and a display apparatus.

BACKGROUND

According to a liquid crystal kinetic theory, when liquid crystals are positioned in an external electric field, the electric field acts on the liquid crystals by a dielectric effect and a flexoelectric effect so as to control the liquid crystals to deflect correspondingly in the electric field.

SUMMARY

Embodiments of the present disclosure relate to a display panel and a display apparatus.

According to an embodiment of the present disclosure, a display panel is provided. The display panel includes a first substrate and a second substrate which are arranged oppositely. A liquid crystal layer is filled between the first substrate and the second substrate. The liquid crystal layer has dielectric anisotropy of parameter in a range from −1 F/m to 1 F/m. A sum of a bending flexural coefficient and a splaying flexoelectric coefficient of the liquid crystal layer is greater than 1 pc/m.

In an example, the liquid crystal layer includes rod-shaped liquid crystals and Dimer liquid crystals.

In an example, a mass percentage of the Dimer liquid crystals in the liquid crystal layer does not exceed 40%.

In an example, the liquid crystal layer further includes Bend Core liquid crystals.

In an example, a mass percentage of the Bend Core liquid crystals in the liquid crystal layer does not exceed 10%.

In an example, the first substrate includes a first base substrate; the second substrate includes a second base substrate; a first alignment film is arranged on a side of the first base substrate, which faces the second base substrate; a second alignment film is arranged on a side of the second base substrate, which faces the first base substrate; and the first alignment film and the second alignment film are configured to allow liquid crystal molecules in the liquid crystal layer to be arranged in a bending structure or splaying structure in a condition without electric field.

In an example, one of the first alignment film and the second alignment film is horizontally aligned, and the other one of the first alignment film and the second alignment film is vertically aligned.

In an example, the first alignment film and the second alignment film are aligned in an anti-parallel direction.

In an example, an electrode layer is arranged between the first base substrate and the first alignment film, and the electrode layer includes a plurality of electrode strips arranged in parallel, and a horizontal electric field is formed between adjacent electrode strips; and under a condition without electric field, an angle between a long axis of the liquid crystal molecules positioned on the surface of the first substrate and an extending direction of the electrode strips is greater than 45 degrees.

In an example, a first polarizer is arranged on a side of the first substrate, which faces away from the second substrate; a second polarizer is arranged on a side of the second substrate, which faces away from the first substrate; and transmissive vibration directions of the first polarizer and the second polarizer are perpendicular to each other.

In an example, the display panel is an In-Plane Switching (IPS) type display panel, an Advanced Super Dimension Switch (ADS) type display panel or a Fringe Field Switching (FFS) type display panel.

An embodiment of the present disclosure also provides a display apparatus, including the display panel.

BRIEF DESCRIPTION OF THE DRAWINGS

Embodiments of the present disclosure will be described in detail hereinafter in conjunction with accompanying drawings to allow one of ordinary skill in the art to understand the present disclosure more clearly, in which.

DETAILED DESCRIPTION

Technical solutions of the embodiments will be described in a clearly and understandable way connected with the drawings related to the embodiments of the disclosure. It is apparent that the described embodiments are just a part but not all of the embodiments of the disclosure. Based on the described embodiments herein, those skilled in the art can obtain other embodiment(s), without any inventive work, which shall be within the scope of the disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present application, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," or the like, are not limited to a physical connection or mechanical connection, but may include an electrical connection/coupling, directly or indirectly. The terms, "on," "under," or the like are only used to indicate relative position relationship, and if the position of the object which is described is changed, the relative position relationship may be changed accordingly.

Figure 1:
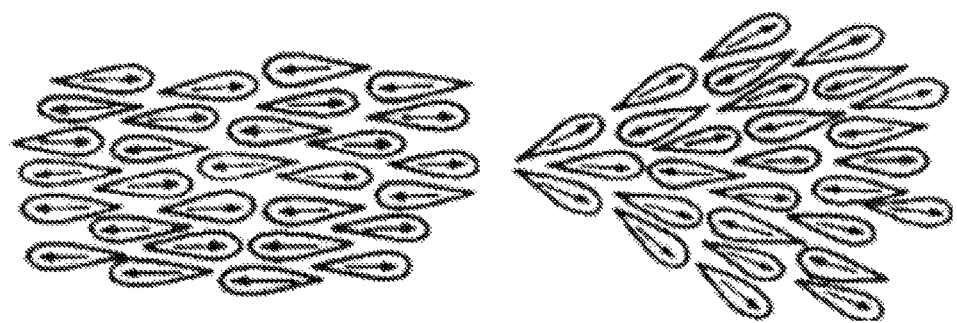
FIG. 1 is a schematic diagram of splaying structure arrangement of rod-shaped liquid crystals, which is formed by a flexoelectric effect.
Figure 2:
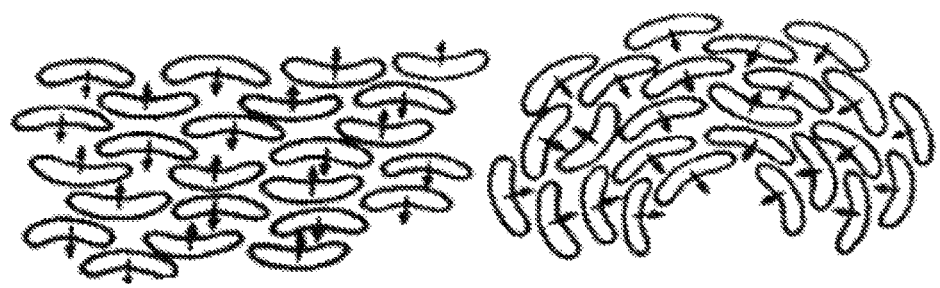
FIG. 2 is a schematic diagram of bending structure arrangement of Bend Core liquid crystals.

FIG. 1 is a schematic diagram of splaying structure arrangement of rod-shaped liquid crystals, which is formed by a flexoelectric effect, and FIG. 2 is a schematic diagram of bending structure arrangement of Bend Core liquid crystals. As shown in FIG. 1 and FIG. 2, liquid crystal molecules have a natural dipole moment, and generally, the liquid crystal molecules are vertically distributed in a liquid crystal cell, and from a statistics point, a forward distribution value and a reverse distribution value of such dipole moment are the same, so a liquid crystal material does not show a macroscopic dipole moment. If the liquid crystals are distorted, however, a certain electric dipole moment can be induced. In the liquid crystals, it is possible that splaying and bending deformation can introduce polarization of the liquid crystals, and conversely, it is also possible that an electric field can allow the liquid crystals to be deformed, and the effect is called as a flexoelectric effect.

In a liquid crystal display technology, the flexoelectric effect is often ignored, and deflection of the liquid crystals is controlled only by a dielectric effect. For example, when an external electric field is in parallel to or perpendicular to a long axis of the molecules, molecular polarizabilities are differently represented as $\alpha_{//}$ and $\alpha_{\perp}$ ($\alpha_{//}$ and $\alpha_{\perp}$ respectively represent components that the molecular polarizabilities are in parallel to or perpendicular to the long axis of the molecules). When one randomly aligned molecule is polarized by the external electric field, due to difference of $\alpha_{//}$ and $\alpha_{\perp}$, difference of a direction of the molecule induced dipole moment and a direction of the external electric field is resulted, so that the molecules rotate. If interaction between the molecules in the liquid crystals and the action between the molecules and the surface of a substrate are considered, rotation will introduce a reverse moment similarly introduced by an elastic restoring force, so that the molecules do not rotate after rotating by an angle, so an alignment effect of the electric field on the liquid crystal molecules is generated.

In order to achieve an effect of utilizing the dielectric effect to control deflection of the liquid crystals in the liquid crystal cell, generally some liquid crystals with a large dielectric anisotropy parameter $\Delta\varepsilon$ are selected, where $\Delta\varepsilon=\varepsilon_{long}-\varepsilon_{short}$, and $\varepsilon_{long}$ and $\varepsilon_{short}$ respectively represent dielectric constants of a long axis direction and a short axis direction of the liquid crystals. In this case, free energy generated between the electric field and the liquid crystals by the dielectric effect is much greater than free energy generated by the flexoelectric effect, and affection of the flexoelectric effect on deflection of the liquid crystals can be ignored.

Response time of the liquid crystals in the liquid crystal cell is an important indicator for evaluating a product, and the response time is equal to a sum of Rise Time and Fall Time. The Rise Time is a time when a display panel is switched to the highest brightness (or 90% of the highest brightness) from the lowest brightness, and the Fall Time is a time when the display panel is switched to the lowest brightness (or 10% of the highest brightness) from the highest brightness. In the process that the display panel is switched to the lowest brightness from the highest brightness, the induced dipole moment generated by a liquid crystal layer is uncontrollable, and thus, the liquid crystals cannot be controlled to be switched to the lowest brightness from the highest brightness by the dielectric effect. In this case, the electric field in the liquid crystal cell can only be removed, and the liquid crystal molecules in the liquid crystal cell are restored to an initial state under the action of elasticity of the liquid crystal molecules, so that implementation of switching to the lowest brightness is realized.

In practical operation, the inventors note that in the process of controlling the liquid crystals to be deflected by the dielectric effect, the response time of the liquid crystals in the liquid crystal cell is relatively long, which affects display performance of the product.

Figure 3:
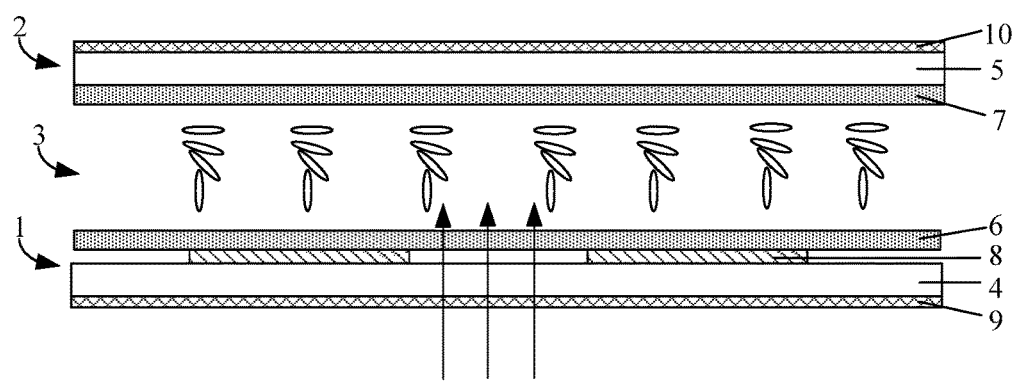
FIG. 3 is a cross-sectional schematic view of a display panel provided according to an embodiment of the present disclosure.

FIG. 3 is a cross-sectional schematic view of a display panel provided by an embodiment of the present disclosure. As shown in FIG. 3, the display panel includes a first substrate 1 and a second substrate 2 which are arranged oppositely, a liquid crystal layer 3 is filled between the first substrate 1 and the second substrate 2. The liquid crystal layer 3 has dielectric anisotropy of parameter $\Delta\varepsilon$ in a range from −1 F/m to 1 F/m. A sum of a bending flexural coefficient $e_1$ and a splaying flexoelectric coefficient $e_3$ of the liquid crystal layer 3 is greater than 1 pc/m. Liquid crystal molecules in the liquid crystal layer 3 are deflected by the flexoelectric effect.

The substrate can be made of glass, plastic or quartz or the like.

It is noted that those skilled in the art should understand that the liquid crystal layer 3 is formed by mixing various single materials. The dielectric anisotropy parameter $\Delta\varepsilon$, the bending flexural coefficient $e_1$ and the splaying flexoelectric coefficient $e_3$ of the liquid crystal layer 3 in the embodiment respectively represent dielectric anisotropy performance, bending flexoelectric performance and splaying flexoelectric performance integrally (macroscopically) of the liquid crystal layer 3 after various liquid crystal materials are mixed. The smaller an absolute value of the dielectric anisotropy parameter $\Delta\varepsilon$ of the liquid crystal layer 3 is, the weaker the dielectric anisotropy performance of the liquid crystal layer 3 is. For example, when the dielectric anisotropy parameter $\Delta\varepsilon$ of the liquid crystal layer 3 is equal to 0, it represents that the entire liquid crystal layer 3 shows dielectric isotropy, the dielectric effect cannot be generated between an external electric field and the liquid crystal layer 3, and at the moment, accuracy of carrying out control by the flexoelectric effect is higher.

Moreover, the flexoelectric performance of the liquid crystal layer 3 can be represented by the sum of the bending flexural coefficient $e_1$ and the splaying flexoelectric coefficient $e_3$ of the liquid crystal layer 3, and the greater the sum of $e_1$ and $e_3$ is, the stronger the flexoelectric characteristic of the liquid crystal layer 3 is.

In the embodiment of the present disclosure, the dielectric anisotropy of the liquid crystal layer 3 is relatively weak and the flexoelectric performance is relatively strong, and thus, when the liquid crystal layer 3 is acted on by the external electric field, free energy generated between the electric field and the liquid crystal layer 3 by the dielectric effect is much smaller than free energy generated by the flexoelectric effect, and effect of the dielectric effect on deflection of the liquid crystals can be ignored, i.e., it can be considered that the electric field controls the liquid crystals to be deflected by the flexoelectric effect.

With continuous reference to FIG. 1 and FIG. 2, deformation of the liquid crystal molecules can lead to the liquid crystal layer 3 to generate the natural dipole moment, and when the induced dipole moment of the liquid crystal layer 3 is reduced to a sufficiently small value ($\Delta\varepsilon$ is relatively small), under the action of the electric field, the liquid crystal layer 3 can be deflected according to the natural dipole moment of the liquid crystal layer 3, so that deflection of the liquid crystal layer 3 has controllability (interference of the induced dipole moment would not present). In this way, in the process that the display panel is switched to the highest brightness from the lowest brightness and in the process that the display panel is switched to the lowest brightness from the highest brightness, control can be carried out by applying the electric field and through the flexoelectric effect.

In the process that the display panel is switched to the lowest brightness from the highest brightness, the liquid crystal layer 3 in the display panel provided by the embodiment of the present disclosure can be deflected under double actions of elasticity of the liquid crystal layer 3 and the flexoelectric effect between the liquid crystal layer 3 and the electric field, so that the "Fall Time" can be greatly reduced. Therefore, the response time of the liquid crystal layer 3 in the display panel provided by the embodiment of the present disclosure is shorter, so that display performance is more excellent. Similarly, in the exemplary embodiment, in the process that the display panel is switched to the lowest brightness from a random gray scale of brightness state, a corresponding control electric field can also be applied to the liquid crystal layer 3, so that the liquid crystal layer 3 can be deflected to an initial alignment state (correspondingly, the display panel shows the lowest brightness) under double actions of elasticity of the liquid crystal layer 3 and the flexoelectric effect between the liquid crystal layer 3 and the control electric field.

Table 1 is a comparison table of the rod-shaped liquid crystals, the Bend Core liquid crystals and Dimer liquid crystals, and the rod-shaped liquid crystals, the Bend Core liquid crystals and the Dimer liquid crystals are as shown in Table 1 below.

In Table 1, the deflection angle refers to a deflection angle of a helical axis of the corresponding liquid crystals by the action of the electric field under a condition of Uniform Lying Helical axis (ULH), which can reflect the range of the flexural characteristics to a certain degree.

In the embodiment, the rod-shaped liquid crystals can be selected from

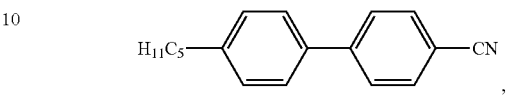

liquid crystals E7 (a mixture), liquid crystals ZLI-4330 (a mixture) and the like.

The Bend Core liquid crystals can be selected from:

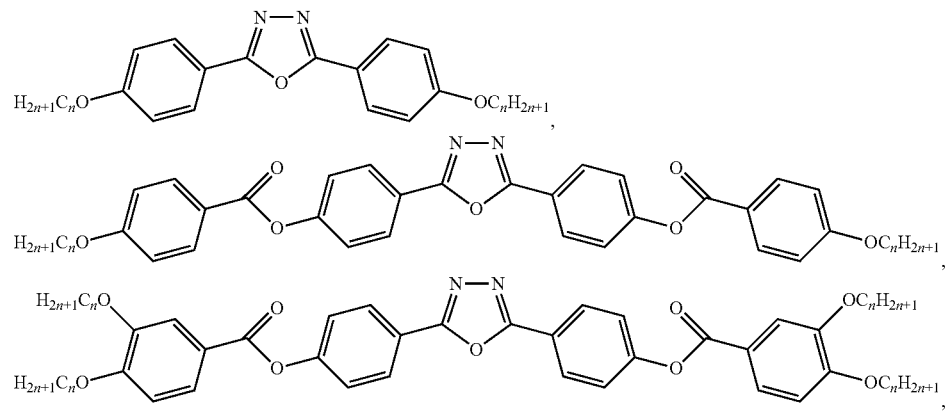

The Dimer liquid crystal can be:

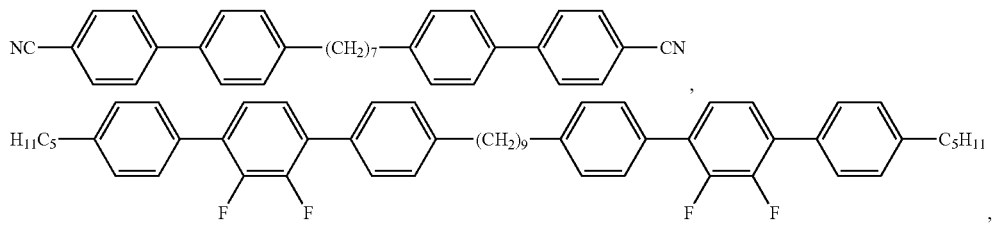

or the like.

As shown in Table 1, the rod-shaped liquid crystals have the relatively weak flexoelectric characteristics, so that the flexoelectric effect is difficult to be shown in the electric field, and some liquid crystal materials with high flexoelectric characteristics need to be mixed in the rod-shaped liquid crystals.

In the embodiment, optionally, the liquid crystal layer 3 includes the rod-shaped liquid crystals and the Dimer liquid crystals. In the embodiment, for example, a mass percentage of the Dimer liquid crystals in the liquid crystal layer 3 does not exceed 40% and for example, it can be 40%, 30%, 20% or 10% so as to prevent a relatively high requirement for a working temperature of the liquid crystal layer 3, which is caused by mixing of the excessive Dimer liquid crystals in the rod-shaped liquid crystals. However, the embodiments of the present disclosure are not limited thereto. High mixed

TABLE 1

Comparison Table of parameters of Rod-shaped Liquid Crystals, Bend Core Liquid Crystals and Dimer Liquid Crystals

|  | Rod-shaped Liquid Crystals | Bend Core Liquid Crystals | Dimer Liquid Crystals |
| --- | --- | --- | --- |
| Flexoelectric Characteristics: $e_1 + e_3$ (pc/m) | Smaller than 10.3 | 30 to 40 | 30 to 40 |
| Deflection Angle | Smaller than 10° | Smaller than 40° | Smaller than 60° |
| Working Temperature | Room Temperature | High Temperature | Low Temperature | energy promotes the flexoelectric characteristics of the liquid crystal layer 3 to a certain degree, so other proper proportions can also be selected.

In the embodiment, the Bend Core liquid crystals can also be added into the liquid crystal layer 3 so as to promote the flexoelectric characteristics of the liquid crystal layer 3. However, also in consideration of the requirement for the working temperature of the liquid crystal layer 3, for example, a mass percentage of the Bend Core liquid crystals in the liquid crystal layer 3 does not exceed 10%, and for example, it can be 10% or 5%. However, the embodiments of the present disclosure are not limited thereto.

In the embodiment, in order to allow the liquid crystal molecules in the liquid crystal layer 3 to rotate uniformly under the action of the electric field, the liquid crystal molecules in the liquid crystal layer 3 are required to form a uniform polarization direction in a state without electric field.

In the embodiment, optionally, for example, the first substrate 1 includes a first base substrate 4, and the second substrate 2 includes a second base substrate 5. A first alignment film 6 is arranged on a side of the first base substrate 4, which faces the second base substrate 5. A second alignment film 7 is arranged on a side of the second base substrate 5, which faces the first base substrate 4. The first alignment film 6 and the second alignment film 7 are used to allow the liquid crystal molecules in the liquid crystal layer 3 to be arranged in a bending or splaying structure under a condition without electric field, i.e., the initial alignment state of the liquid crystal layer 3 is a bending or splaying state, so that uniformity of the polarization directions of the liquid crystal molecules in the liquid crystal layer 3 can be achieved.

Figure 4:
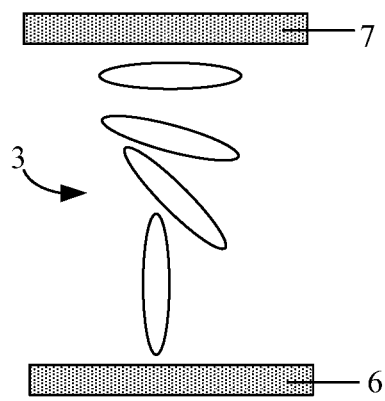
FIG. 4 is a schematic diagram in which a first alignment film is vertically aligned and a second alignment film is horizontally aligned.
Figure 5:
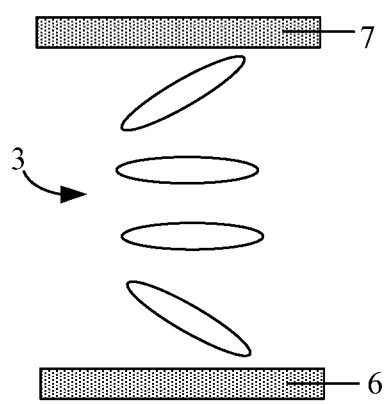
FIG. 5 is a schematic diagram in which the first alignment film and the second alignment film are aligned in an anti-parallel direction mode.

FIG. 4 is a schematic diagram that the first alignment film is vertically aligned and the second alignment film is horizontally aligned, and FIG. 5 is a schematic diagram that the first alignment film and the second alignment film are aligned in an anti-parallel direction. As shown in FIG. 4 and FIG. 5, the first alignment film 6 is vertically aligned and the second alignment film 7 is horizontally aligned, or the first alignment film 6 and the second alignment film 7 are aligned in an anti-parallel direction, so that the liquid crystal molecules in the liquid crystal layer 3 are arranged in a bending or splaying structure under a condition without electric field.

One of ordinary skill in the art should understand that in the embodiment, the first alignment film 6 can also be horizontally aligned and the second alignment film 7 can be vertically aligned so as to implement arrangement of the liquid crystal molecules in a bending or splaying structure under a condition without electric field, which are not shown.

In the embodiment, optionally, an electrode 8 layer is arranged between the first base substrate 4 and the first alignment film 6, the electrode 8 layer includes a plurality of electrode 8 strips arranged in parallel, a horizontal electric field is formed between each two adjacent electrode 8 strips, and under a condition without electric field, an angle between the long axis of the liquid crystal molecules positioned on the surface of the first substrate 1 and an extending direction of the electrode 8 strips is greater than 45 degrees.

To allow the liquid crystals to be deflected in the electric field, a certain included angle needs to be kept between the polarization direction of the liquid crystals and the electric field, and only when the liquid crystals rotate by over 45 degrees, a phase delay direction and an initial direction of the liquid crystals can reach a level of 45 degrees, and transmittance can reach the maximum value.

It is noted that for the case of controlling the liquid crystals to be deflected by adopting the dielectric effect, when an included angle between the liquid crystal molecules and an electrode 8 is 90 degrees, after the electric field is applied, the liquid crystal molecules can rotate leftwards and it also can rotate rightwards, in this case, a phenomena that part of liquid crystals in the liquid crystal layer 3 are leftward, part of liquid crystals are rightward and a phase fault line will be formed at positions of boundaries. However, in the embodiments of the present disclosure, the liquid crystals are controlled to be deflected by the flexoelectric effect, i.e., the inherent polarity of the liquid crystals is utilized, and the polarity direction of the liquid crystals only has one choice under the action of the electric field, i.e., the polarity direction is consistent with the direction of the electric field, and thus, in the embodiments of the present disclosure, even though the included angle between the liquid crystal molecules and the electrode 8 is 90 degrees, the deflection direction of the liquid crystal molecules is also fixed, so that no phase fault line is formed.

In the embodiment, a first polarizer 9 is arranged on a side of the first substrate 1, which faces away from the second substrate 2; a second polarizer 10 is arranged on a side of the second substrate 2, which faces away from the first substrate 1; and transmissive vibration directions of the first polarizer and the second polarizer are perpendicular to each other.

Three types of different liquid crystal layers 3 will be exemplarily given below, and photoelectric characteristics of the three types of liquid crystal layers 3 will be analyzed. Table 2 is an ingredient table of three types of different liquid crystal layers 3, and the three types of different liquid crystal layers 3 are as shown in Table 2 below.

TABLE 2

Table of Schematic Ingredients and Dielectric Anisotropy Characteristics of Three Types of Different Liquid Crystal Layers 3

| | Liquid Crystals ZLI-4330 | Liquid Crystals CB7CB | Liquid Crystals MAT-11-575 | Δε |
|---|---|---|---|---|
| Liquid Crystal Layer A | 75% | 10% | 15% | −0.14 |
| Liquid Crystal Layer B | 70% | 20% | 10% | −0.04 |
| Liquid Crystal Layer C | 70% | 30% | 0 | −0.17 |

In Table 2, the liquid crystals ZLI-4330 (mixtures, negative materials) are the rod-shaped liquid crystals, the liquid crystals CB7CB (the molecular formula is

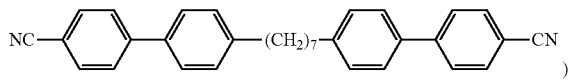

)

are the Dimer liquid crystals, the liquid crystals MAT-11-575 (mixtures, positive materials) are the Bend Core liquid crystals, and three types of liquid crystals are common liquid crystals and are not described in details herein. By controlling the mass percentage of the liquid crystals ZLI-4330, the liquid crystals CB7CB and the liquid crystals MAT-11-575 in the respective mixing process, three types of liquid crystal layers 3 with different characteristics can be formed.

Figure 6:
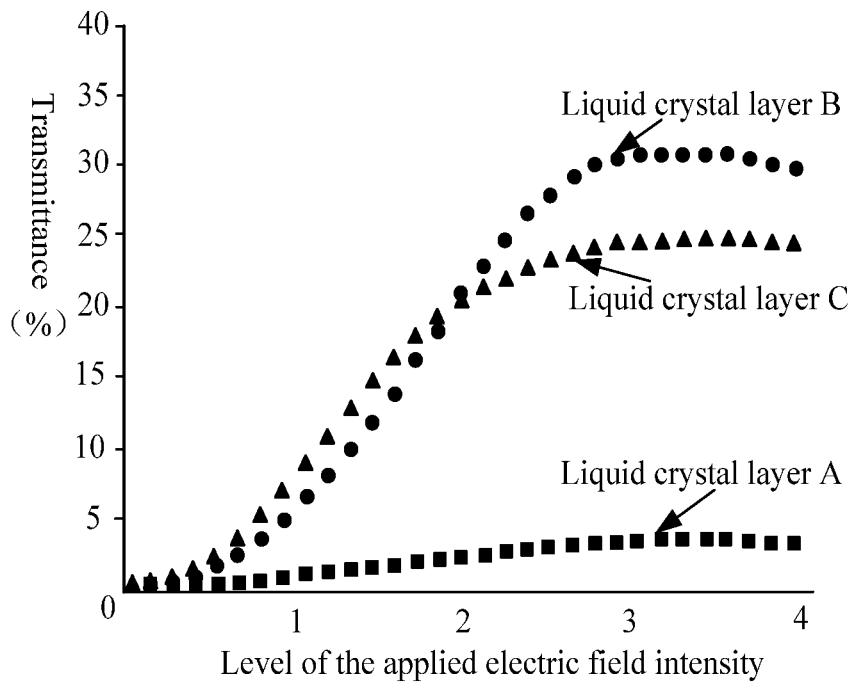
FIG. 6 is a schematic diagram of transmittances of three types of different liquid crystal layers in different electric fields.
Figure 7:
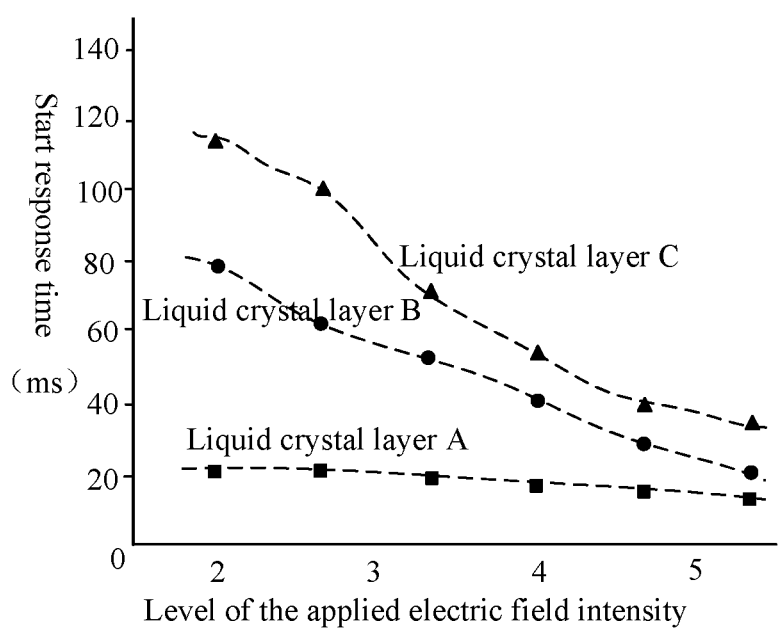
FIG. 7 is a schematic diagram of start response time of three types of different liquid crystal layers in different electric fields.

FIG. 6 is a schematic diagram of transmittances of three types of different liquid crystal layers in different electric fields, and FIG. 7 is a schematic diagram of start response time of three types of different liquid crystal layers in different electric fields. As shown in FIG. 6, no matter which one of the liquid crystal layer A, the liquid crystal layer B or the liquid crystal layer C is used by the liquid crystal layer in the display panel, an effect that the transmittance of the display panel is changed under the control of the electric field can be achieved, i.e., a display gray scale of the display panel is changed. In this way, the technical solutions of the embodiments of the present disclosure are practical.

The "start response time" in the embodiments of the present disclosure refers to a time when the liquid crystal layer is deflected to a corresponding target state (the display panel shows the corresponding gray scale) from the initial state under the control of the electric field. As shown in FIG. 7, in the experiment process, under the action of the same electric field, the start response time of the liquid crystal layer A is shorter than that of the liquid crystal layer B, and the start response time of the liquid crystal layer B is shorter than that of the liquid crystal layer C, i.e., with the increasing of the liquid crystals CB7CB, the start response time of the liquid crystal layer 3 would be increased (correspondingly, the Rise Time, the Fall Time and the response time of the liquid crystal layer 3 are all increased). The main reason of the problem is that the liquid crystals CB7CB have a relatively large viscosity coefficient so that the deflection of the liquid crystals is affected.

In an experiment, for example, the liquid crystal layer 3 in the display panel is the liquid crystal layer C, and if no electric field is applied to the display panel in the process of switching to the lowest brightness from the highest brightness, the liquid crystal layer C is deflected only by elasticity of the liquid crystal layer C and the measured response time of the liquid crystal layer C is 98 ms. However, if the corresponding control electric field is applied to the display panel in the process of switching to the lowest brightness from the highest brightness, the liquid crystal layer C is deflected under the double actions of elasticity of the liquid crystal layer C and the flexoelectric effect of the electric field and the measured response time of the liquid crystal layer C is 8.3 ms. In this way, by using the Dimer liquid crystals with a relatively small viscosity coefficient (approximate to the level of common liquid crystals), it is possible to realize a response speed of the liquid crystal layer 3 of about 1 ms.

Moreover, as shown in FIG. 7, with the increasing of the intensity of the applied electric field, the start response time of the liquid crystal layer 3 can also be shortened, so that it can be concluded that as the increasing of a driving voltage, the Rise Time and the Fall Time (in the case of control by the electric field) of the liquid crystal layer 3 can also be shortened correspondingly. In this way, in an exemplary embodiment, the liquid crystals can be controlled to be deflected in an over-driving (high driving voltage) mode, so that the response time of the liquid crystal layer 3 can be greatly promoted.

In the embodiment, the display panel can be an In-Plane Switching (IPS) type display panel, an Advanced Super Dimension Switch (ADS) type display panel or a Fringe Field Switching (FFS) type display panel. A horizontal electric field can be generated in the IPS type display panel, the ADS type display panel and the FFS type display panel, so that the liquid crystal molecules in the liquid crystal layer 3 can be deflected in plane.

An embodiment of the present disclosure also provides a display apparatus which includes a display panel. The display device adopts the display panel in the embodiments above. The specific contents can refer to the description about the display panel in the embodiments above, and are not repeated herein.

The embodiments of the present disclosure provide the display panel and the display apparatus. The display panel includes the first substrate and the second substrate which are arranged oppositely, the liquid crystal layer is filled between the first substrate and the second substrate, the liquid crystal layer has dielectric anisotropy of parameter in a range of $\Delta\varepsilon[-1, 1]$, the sum of the bending flexoelectric coefficient $e_1$ and the splaying flexoelectric coefficient $e_3$ of the liquid crystal layer is greater than 1 pc/m, and the liquid crystal molecules in the liquid crystal layer are deflected by the flexoelectric effect. According to the technical solutions of the embodiments of the present disclosure, in the process that the display panel is switched to the lowest brightness from a random gray scale of brightness state, by applying a control electric field to the liquid crystal layer, the liquid crystal layer can be deflected under the double actions of elasticity of the liquid crystal layer and the flexoelectric effect between the liquid crystal layer and the control electric field, so that deflecting speed of the liquid crystal molecules in the liquid crystal layer can be improved. Correspondingly, the technical solutions of the embodiments of the present disclosure can effectively shorten the response time of the liquid crystal layer.

It is understood that the described above are only illustrative implementations of the present disclosure for explaining the principle of the present disclosure, and the present disclosure is not limited thereto. For one of ordinary skill in the art, various modifications and improvements may be readily contemplated without departing from the spirit and scope of the present disclosure, and all of which shall fall within the scope of the present disclosure.

The present application claims priority to and benefits of the Chinese Patent Application No. 201610070365.0 filed on Feb. 1, 2016 and entitled 'DISPLAY PANEL AND DISPLAY APPARATUS', the entire contents of which are incorporated herein by reference.

What is claimed is:

1. A display panel, comprising: a first substrate and a second substrate which are arranged oppositely, wherein a liquid crystal layer is filled between the first substrate and the second substrate, and the liquid crystal layer has dielectric anisotropy of parameter in a range from −1 F/m to 1 F/m; and a sum of a bending flexural coefficient and a splaying flexoelectric coefficient of the liquid crystal layer is greater than 1 pc/m;

wherein an electrode layer is arranged between the first base substrate and the first alignment film, and the electrode layer comprises a plurality of electrode strips, all of the electrode strips being arranged in parallel, and a horizontal electric field is formed between adjacent electrode strips in parallel;

wherein the liquid crystal layer comprises rod-shaped liquid crystals and Dimer liquid crystals, the rod-shaped liquid crystals being selected from

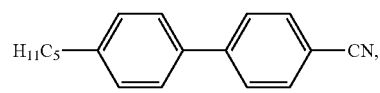

or liquid crystals ZLI-4330, and the Dimer liquid crystals being selected from

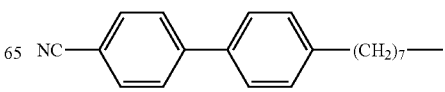

-continued

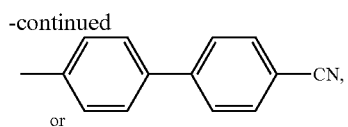

or

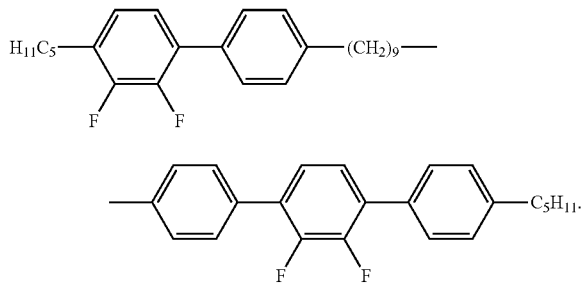

2. The display panel according to claim 1, wherein a mass percentage of the Dimer liquid crystals in the liquid crystal layer does not exceed 40%.

3. The display panel according to claim 1, wherein the liquid crystal layer further comprises Bend Core liquid crystals, the Bend Core liquid crystals

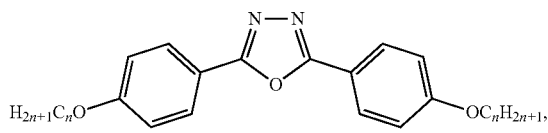

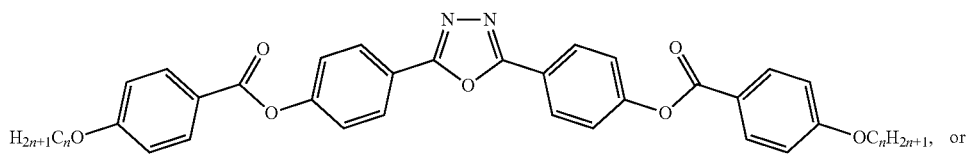

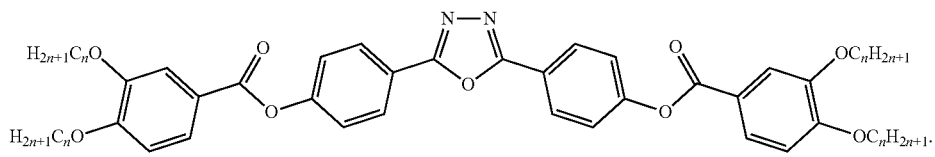

4. The display panel according to claim 2, wherein a mass percentage of Bend Core liquid crystals in the liquid crystal layer does not exceed 10%.

5. The display panel according to claim 1, wherein the first substrate comprises a first base substrate; the second substrate comprises a second base substrate; a first alignment film is arranged on a side of the first base substrate, which faces the second base substrate; a second alignment film is arranged on a side of the second base substrate, which faces the first base substrate; and the first alignment film and the second alignment film are configured to allow liquid crystal molecules in the liquid crystal layer to be arranged in a bending structure or splaying structure in a condition without electric field.

6. The display panel according to claim 5, wherein one of the first alignment film and the second alignment film is horizontally aligned, and the other one of the first alignment film and the second alignment film is vertically aligned.

7. The display panel according to claim 5, wherein the first alignment film and the second alignment film are aligned in an anti-parallel direction.

8. The display panel according to claim 1, wherein a first polarizer is arranged on a side of the first substrate, which faces away from the second substrate; a second polarizer is arranged on a side of the second substrate, which faces away from the first substrate; and transmissive vibration directions of the first polarizer and the second polarizer are perpendicular to each other.

9. The display panel according to claim 1, wherein the display panel is an In-Plane Switching (IPS) type display panel, an Advanced Super Dimension Switch (ADS) type display panel or a Fringe Field Switching (FFS) type display panel.

10. A display apparatus comprising display panel, wherein the display panel comprising: a first substrate and a second substrate which are arranged oppositely, wherein a liquid crystal layer is filled between the first substrate and the second substrate, and the liquid crystal layer has dielectric anisotropy of parameter in a range from −1 F/m to 1 F/m; and a sum of a bending flexural coefficient and a splaying flexoelectric coefficient of the liquid crystal layer is greater than 1 pc/m, wherein an electrode layer is arranged between the first base substrate and the first alignment film, and the electrode layer comprises a plurality of electrode strips, all of the electrode strips being arranged in parallel, and a horizontal electric field is formed between adjacent electrode strips in parallel;

wherein the liquid crystal layer comprises rod-shaped liquid crystals and Dimer liquid crystals, the rod-shaped liquid crystals being selected from

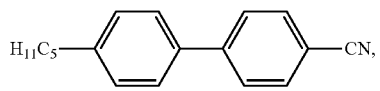

or liquid crystals ZLI-4330, and the Dimer liquid crystals being selected from

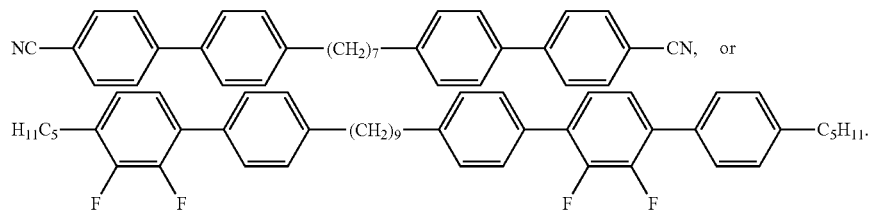

11. The display panel according to claim 1, wherein the liquid crystal layer further comprises Bend Core liquid crystals, the Bend Core liquid crystals being selected from

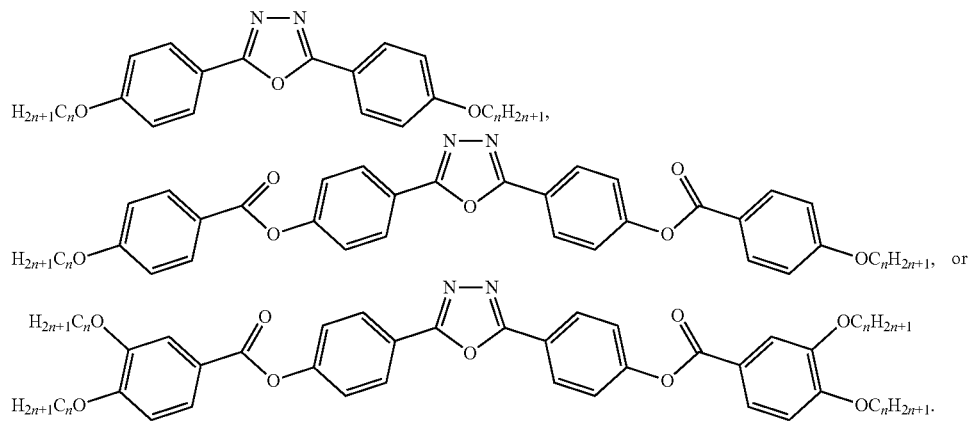

12. The display panel according to claim 3, wherein a mass percentage of the Bend Core liquid crystals in the liquid crystal layer does not exceed 10%.

13. The display panel according to claim 11, wherein a mass percentage of the Bend Core liquid crystals in the liquid crystal layer does not exceed 10%.

14. The display panel according to claim 6, wherein an electrode layer is arranged between the first base substrate and the first alignment film, and the electrode layer comprises a plurality of electrode strips arranged in parallel, and a horizontal electric field is formed between adjacent electrode strips; and
under a condition without electric field, an angle between a long axis of the liquid crystal molecules positioned on the surface of the first substrate and an extending direction of the electrode strips is greater than 45 degrees.

15. The display panel according to claim 7, wherein an electrode layer is arranged between the first base substrate and the first alignment film, and the electrode layer comprises a plurality of electrode strips arranged in parallel, and a horizontal electric field is formed between adjacent electrode strips; and
under a condition without electric field, an angle between a long axis of the liquid crystal molecules positioned on the surface of the first substrate and an extending direction of the electrode strips is greater than 45 degrees.

16. The display panel according to claim 4, wherein a first polarizer is arranged on a side of the first substrate, which faces away from the second substrate; a second polarizer is arranged on a side of the second substrate, which faces away from the first substrate; and transmissive vibration directions of the first polarizer and the second polarizer are perpendicular to each other.

17. The display panel according to claim 2, wherein a first polarizer is arranged on a side of the first substrate, which faces away from the second substrate; a second polarizer is arranged on a side of the second substrate, which faces away from the first substrate; and transmissive vibration directions of the first polarizer and the second polarizer are perpendicular to each other.

18. The display panel according to claim 1, wherein an angle between a long axis of the liquid crystal molecules positioned on the surface of the first substrate and an extending direction of the electrode strips is greater than 45 degrees under a condition without electric field.

* * * * *